July 1, 1969 J. E. LINSE 3,453,394

SIDETONE CIRCUIT FOR 4-WIRE SECURE TELEPHONE

Filed Dec. 1, 1965 Sheet 1 of 2

INVENTOR
J. E. LINSE
BY E J Oluider
ATTORNEY

July 1, 1969 J. E. LINSE 3,453,394

SIDETONE CIRCUIT FOR 4-WIRE SECURE TELEPHONE

Filed Dec. 1, 1965 Sheet 2 of 2

United States Patent Office 3,453,394

Patented July 1, 1969

3,453,394

SIDETONE CIRCUIT FOR 4-WIRE SECURE TELEPHONE

John E. Linse, Neptune, N.J., assignor to Bell Telephone Laboratories, Incorporated, New York, N.Y., a corporation of New York Filed Dec. 1, 1965, Ser. No. 510,878

Int. Cl. H04m *1/19, 1/68*

U.S. Cl. 179—81 8 Claims

ABSTRACT OF THE DISCLOSURE

In a four-wire telephone station set a transistor loss amplifier is connected between the receive and transmit paths in order to provide the proper level of sidetone to the receiver.

Figure 1:
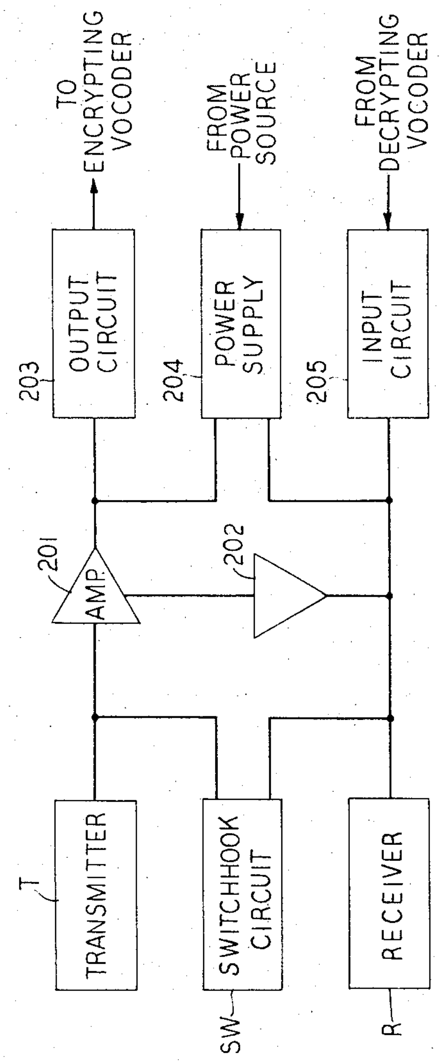

This invention relates to subscriber telephone sets and more particularly to high security sets of the four-wire type that provide protection against unauthorized interception of the intelligence transmitted thereover.

One well-known means of enhancing the security of telephone voice transmission is the utilization of encoding or scrambling equipment that separates the complex speech waves into component frequency bands that may then be transmitted without disclosing the intelligence represented. One example of such equipment is the vocoder disclosed by H. W. Dudley in Patent 2,098,956 issued Nov. 16,1937. In such an arrangement it is evident that separation must be maintained between the transmit and receive paths inasmuch as the encoding and decoding of the transmitted and received speech are necessarily separate and distinct operations. Separation of communication paths is typically achieved by a four-wire system wherein a unique pair of conductors is utilized for the transmit and receive sides of the line.

One characteristic of a conventional four-wire telephone set is the complete absence of sidetone, sidetone being defined as the presence of transmitted signals on the receive side of the line at the transmitting station. In two-wire systems the presence of sidetone poses a problem in that circuit means, such as balanced hybrid coils for example, must be provided to reduce sidetone to an acceptable level. In four-wire circuits, however, the opposite problem is presented in that the complete absence of sidetone reduces the naturalness of a conversation and is psychologically conducive to a certain awkwardness in communication. Prior art arrangements for meeting this problem have employed resistive loss pads, for example, between the transmit and receive sides of the line in order to provide sidetone. Such an expedient is not entirely satisfactory, however, in that it tends to create echo problems and additionally provides a path for coupling energy from the receive side of the line back around the subscriber loop with the attendant danger of singing and, in high security systems, garbled encryption.

Accordingly, a broad object of the invention is to enhance the communication quality of four-wire telephone circuits.

Another object is to improve sidetone circuits in four-wire telephone networks.

A further object is to avoid echo problems in four-wire telephone circuits provided with sidetone.

An additional object is to eliminate the possibility of coupling energy from the receive side of the line to the transmit side in four-wire telephone subsets employing sidetone circuits.

These and other objects are achieved in accordance with the principles of the invention in an illustrative embodiment wherein a unique sidetone circuit is employed between the receive and transmit sides of the line in a four-wire telephone set. The subset of the embodiment disclosed herein is adapted to drive encoding apparatus, such as a vocoder, for example, and accordingly a multistage transistor amplifier is employed on the transmit side of the line to ensure adequate driving power. In accordance with the invention, a transistor loss amplifier is uniquely connected between the transmit side of the line and the receive side of the line in order to provide the proper level of sidetone signal to the receiver. Two-fold protection is provided against the possibility of coupling energy from the receive side of the line to the output point of the transmit side of the line. First, such coupling is substantially eliminated by the one-way transmission properties of the sidetone loss amplifier. Further, on the transmit side of the line the sidetone circuit is connected at a point preceding the final stage of the transmit amplifier. Additional impedance is interposed thereby between the receive side of the line and the output point of the transmit amplifier. More importantly, the sidetone circuit and hence the receive side of the line are isolated from the effect of load changes that occur at the output of the transmit side of the line. Without such isolation, load changes would be reflected on to the receive side of the line creating uncontrolled variations in the level of received signals.

Accordingly, one feature of the invention involves the use of a loss amplifier to provide sidetone in a four-wire telephone set.

Another feature relates to a transistor loss amplifier connected from the receive side of the line in a four-wire subset to a point on the transmit side between a pair of stages in a multistage transmit amplifier.

Figure 2:
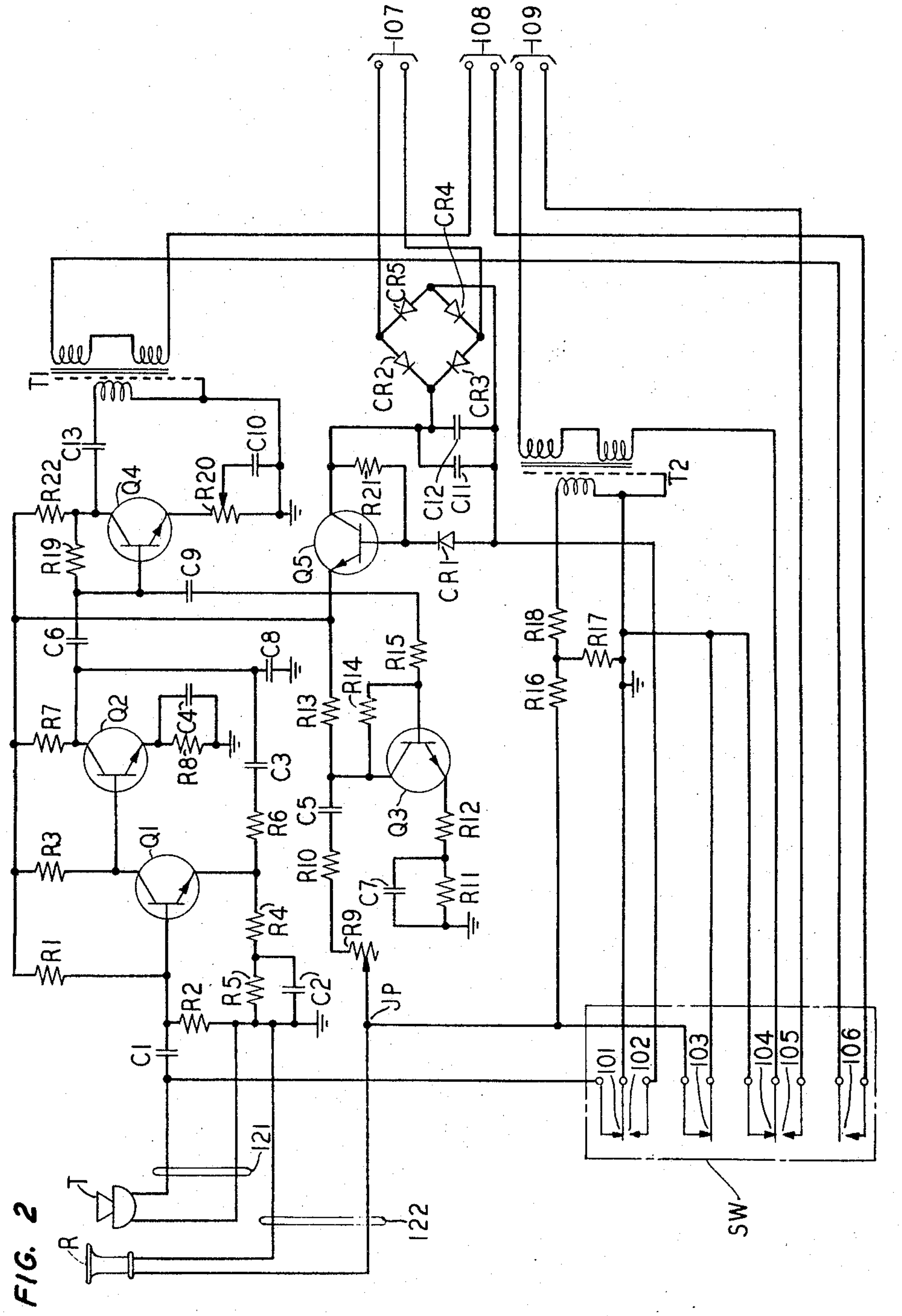

The principles of the invention and additional objects and features thereof will be fully apprehended from the following detailed description of an illustrative embodiment and from the drawing in which:

FIG. 1 is a block diagram of a high security telephone system employing a subset in accordance with the invention; and FIG. 2 is a schematic circuit diagram of a high security telephone set in accordance with the invention.

In FIG. 1 the subset of the embodiment shown comprises a transmitter T which provides an input for a multistage amplifier 201. The output of amplifier 201 is applied to the input of an output circuit 203, which may include a transformer, for example, and the final output is directed to suitable encryption equipment, not shown, such as a vocoder.

On the receive side of the line in FIG. 1, signals from decryption equipment, such as a vocoder, are applied directly to the receiver R through an input circuit 205, which may include a transformer. In accordance with the invention a loss amplifier 202 is connected from an intermediate or interstage point in the amplifier 201 to the receive side of the line in order to provide a controlled level of sidestone.

A power supply 204 provides biasing voltage for the amplifiers. To enhance the security aspects of the set, a switchhook circuit SW, through contacts not shown, provides suitable disconnect means for the transmit and receive line connections, for the power supply and for the transmitter T and receive R.

As shown in greater detail in FIG. 2, a telephone set in accordance with the principles of the invention includes a transmitter T connected to an output pair 108 by way of transmit leads 121, a three-stage transistor amplifier comprising transistors Q1, Q2 and Q4 and an ouput transformer T1.

On the input side of the circuit a receiver R is connected by way of an input pair 122 and an input transformer T2 to receiver input terminals 109.

Additional details on the transmit side of the circuit include a coupling capacitor C1 in the base circuit of transistor Q1. Resistors R1, R2, R3, R4 and R5 establish suitable biasing levels for transistor Q1. A bypass to ground in the emitter circuit of transistor Q1 is provided by capacitor C2. The output of transistor Q1 is applied directly to the base of transistor Q2. Collector bias for transistor Q2 is established in part by resistor R7. Similarly, the emitter bias for transistor Q2 is established by resistor R8 with its associated bypass capacitor C4. Resistor R6 and capacitors C3 and C8 are employed to shape the frequency response of the amplifier.

The collector output of transistor Q2 is applied to the base of the output transistor Q4 by way of a coupling capacitor C6. Resistor R22 fixes the bias level on the collector of transistor Q4. The gain of the amplifier can be varied by adjusting variable resistor R20 which controls the level of degenerative feedback. A high frequency bypass for resistor R20 is provided by capacitor C10. Stabilization of the output stage is effected by feedback resistor R19 between the collector and base of transistor Q4. The collector output of transistor Q4 is applied to the primary of transformer T1 by way of capacitor C13.

Terminals 107 are adapted for connection to an A-C power source. Incoming A-C power is rectified by a full wave rectifier comprising diodes CR2, CR3, CR4, CR5 and filter capacitors C11 and C12. Transistor Q5 operates as a voltage regulator with feedback stabilization provided by resistor R21. In the base circuit of transistor Q5 Zener diode CR1 clamps the D-C supply voltage at a suitable level which may be on the order of 24 volts for example. The emitter output of transistor Q5 furnishes regulated D-C biasing potential for transistors Q1, Q2, Q3 and Q4.

In accordance with the invention, a sidetone circuit is connected between the base of transistor Q4 to a junction point JP on the receive side of the circuit The sidetone circuit includes a coupling capacitor C9 and a relatively high loss resistor R15 in the base circuit of transistor Q3. Resistor R14 connected between the base and collector electrodes of transistor Q3 is for the purpose of feedback stabilization. Resistors R11 (bypassed by capacitor C7), R12, and R13 establish suitable biasing levels for transistor Q3. The collector output of transistor Q3 is applied to junction point JP in the receive path by way of capacitor C5, resistor R10 and variable resistor R9.

The incoming signals applied to receive input terminals 109 are supplied from a vocoder by way of suitable decryption apparatus and the level of such signals is typically above that which may be applied directly to the receiver. An attenuator pad comprising resistors R16, R17 and R18 provides an impedance match and reduces the incoming signal to a suitable listening level.

In a circuit of the type shown, it is evident that changes in load may occur, particularly on the transmit side of the line inasmuch as transmitter T and its associated amplifier comprising transistors Q1, Q2 and Q4 are driving encryption apparatus, such as a vocoder for example, by way of output transformer T1. It is of course undesirable to have such load changes reflected back and coupled into the receive side of the line. This danger is avoided, in accordance with the invention, by utilizing transistor Q4 to perform a dual function. Specifically, transistor Q4 serves as an isolation device between output transformer T1 and the sidetone circuit employing transistor Q3 and, additionally, transistor Q4 functions as the output stage of the multistage transmit amplifier. Further, in accordance with the invention, the coupling of energy from the receive side of the line to the transmit side of the line by way of the sidetone circuit is avoided inasmuch as sidetone transistor Q3 provides only one direction of transmission.

As indicated above, a telephone set in accordance with the invention is designed for use in those applications where a high degree of security is required. An additional degree of security is afforded by the switchhook arrangement SW. FIG. 2 illustrates switchhook SW in the on-hook condition with contacts 101 shorting out transmitter T, contacts 103 shorting out receiver R, contacts 104 shorting out the receive side of the line and contacts 106 maintaining an open in the transmit side of the line. In the off-hook condition contacts 102 close to complete the power supply circuit, contacts 105 close to connect the receive side of the set to the line and contacts 106 close to connect the set across output terminals 108.

It is to be understood that the embodiment disclosed herein is merely illustrative of the principles of the invention. Various modifications may be made thereto by persons skilled in the art without departing from the spirit and scope of the invention.

What is claimed is:

1. In a four-wire telephone station set, in combination, a transmitter, a receiver, first means including a first two-wire path connecting said transmitter to an output point, second means including a second two-wire path connecting said receiver to an input point, said first means further including a multistage transistor amplifier and means including a loss amplifier connected between said first means and said second means for providing sidetone to said receiver.

2. Apparatus in accordance with claim 1 wherein said first means includes a first junction located intermediate two of said stages of said multistage amplifier, said second means including a second junction point and said loss amplifier being connected between said junction points.

3. Apparatus in accordance with claim 2, said loss amplifier comprising a transistor having base, emitter and collector electrodes, and a first resistive element and a first capacitive element being connected between said base electrode and said first junction point.

4. Apparatus in accordance with claim 1, said multistage amplifier comprising at least three stages, the final one of said stages comprising a transistor having base, emitter and collector electrodes, said loss amplifier comprising a single transistor having base, emitter and collector electrodes, said means connected between said first and second means extending from the base of said final stage transistor to the base of said single transistor.

5. Apparatus in accordance with claim 4 wherein said last named means includes a relatively high loss resistive element and a coupling capacitive element.

6. In a four-wire telephone station set a receiver, a transmitter, a receiver input point, a transmitter output point, a first two-wire circuit connecting said transmitter to said output point, a second two-wire circuit connecting said receiver to said input point, said first circuit including a multistage transistor amplifier and an output transformer, said second circuit including an input transformer and first means including a single stage transistor loss amplifier connected between the input point of the final stage of said multistage amplifier and a point on said second circuit between said input transformer and said receiver.

7. Apparatus in accordance with claim 6 including variable attenuator means connected between said last named point and the output of said loss amplifier.

8. Apparatus in accordance with claim 7 wherein said first means includes a relatively high magnitude resistive element and a capacity element in series relation connected between the base electrode of the transistor of the final stage of said multistage amplifier and the base electrode of the transistor in said loss amplifier.

References Cited

UNITED STATES PATENTS

| | | | |
|---|---|---|---|
| 3,146,313 | 8/1964 | Ulin | 179—81 |
| 3,387,096 | 6/1968 | Grandstaff et al. | 179—81 |

WILLIAM C. COOPER, *Primary Examiner.*

C. W. JIRAUCH, *Assistant Examiner.*